(12) United States Patent
Fukaya

(10) Patent No.: US 8,342,671 B2
(45) Date of Patent: Jan. 1, 2013

(54) WATER-BASED COLORING MATERIAL, WATER-BASED INK FOR INK-JET RECORDING, INK-JET RECORDING METHOD, AND INK-JET RECORDING APPARATUS

(75) Inventor: Hideji Fukaya, Nisshin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/207,844

(22) Filed: Aug. 11, 2011

(65) Prior Publication Data

US 2012/0081460 A1   Apr. 5, 2012

(30) Foreign Application Priority Data

Sep. 30, 2010   (JP) ................. 2010-223247

(51) Int. Cl.
*G01D 11/00*   (2006.01)
(52) U.S. Cl. ..................... 347/100; 106/31.13
(58) Field of Classification Search .............. 347/15, 347/43, 95–100; 106/31.13
See application file for complete search history.

(56) References Cited

U.S. PATENT DOCUMENTS

| 5,609,671 | A | 3/1997 | Nagasawa |
| 5,837,045 | A | 11/1998 | Johnson et al. |
| 7,384,464 | B2 * | 6/2008 | Wood et al. ............... 106/31.43 |
| 2006/0201380 | A1 | 9/2006 | Kowalski et al. |
| 2007/0100023 | A1 | 5/2007 | Burns et al. |
| 2007/0100024 | A1 | 5/2007 | Gu et al. |
| 2009/0231406 | A1 | 9/2009 | Yamashita et al. |
| 2010/0168322 | A1 | 7/2010 | Ikoshi et al. |

FOREIGN PATENT DOCUMENTS

| JP | 08-003498 | 1/1996 |
| JP | 2000-513396 | 10/2000 |
| JP | 2004-210902 | 7/2004 |
| JP | 2008-524400 | 7/2008 |
| JP | 2009-515007 | 4/2009 |
| JP | 2009-221331 | 10/2009 |
| JP | 2010-155908 | 7/2010 |

* cited by examiner

*Primary Examiner* — Thinh Nguyen
(74) *Attorney, Agent, or Firm* — Banner & Witcoff, Ltd.

(57) ABSTRACT

A water-based coloring material which colors a medium and which is to be used together with water, the water-based coloring material includes a colorant and polyetheramine represented by chemical formula (1):

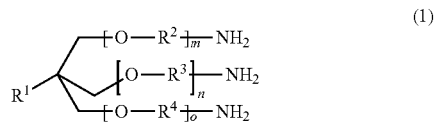

wherein $R^1$ is a substituted or unsubstituted alkyl group which has 1 to 4 carbon atoms and has a straight chain or a branched chain; $R^2$, $R^3$, and $R^4$ are substituted or unsubstituted alkylene groups each of which has 1 to 4 carbon atoms and has a straight chain or a branched chain, and $R^2$, $R^3$, and $R^4$ are identical with each other or different from each other; and each of m, n, and o is an integer of 1 to 5.

11 Claims, 1 Drawing Sheet

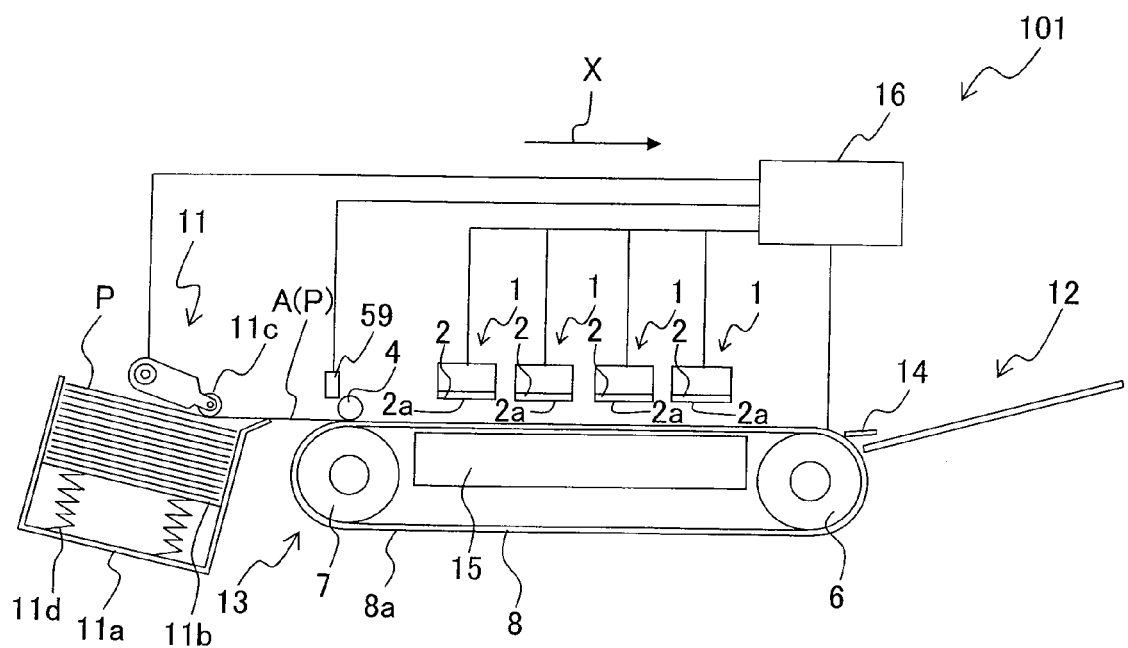

WATER-BASED COLORING MATERIAL, WATER-BASED INK FOR INK-JET RECORDING, INK-JET RECORDING METHOD, AND INK-JET RECORDING APPARATUS

CROSS REFERENCE TO RELATED APPLICATION

The present application claims priority from Japanese Patent Application No. 2010-223247, filed on Sep. 30, 2010, the disclosure of which is incorporated herein by reference in its entirety.

BACKGROUND OF THE INVENTION

1. Field of the Invention

The present invention relates to a water-based coloring material, a water-based ink for ink-jet recording, an ink-jet recording method, and an ink-jet recording apparatus.

2. Description of the Related Art

In the ink-jet recording based on the use of a water-based ink, the curl arises on the recorded matter in some cases. In order to solve this problem, a water-based ink, which is blended with trimethylolpropane (TMP) capable of suppressing the curl, has been suggested. Further, an ink, in which the blending amount of water is decreased, has been suggested to suppress the curl.

However, the curl is not suppressed sufficiently in the case of the water-based ink in which TMP is blended. Further, a problem arises in relation to the increase in viscosity in the case of the ink in which the blending amount of water is decreased. The water-based ink for ink-jet recording is a kind of the water-based coloring material which colors the medium and which is to be used together with water. The problem of the curl of the colored medium (recorded matter) is the problem which is common to the water-based coloring materials.

SUMMARY OF THE INVENTION

In view of the above, an object of the present invention is to provide a water-based coloring material such as a water-based ink for ink-jet recording or the like which is capable of sufficiently suppressing the curl of the recorded matter (colored medium) and which does not cause the increase in viscosity as well.

According to a first aspect, there is provided a water-based coloring material which colors a medium and which is to be used together with water, the water-based coloring material including a colorant and polyetheramine represented by chemical formula (1):

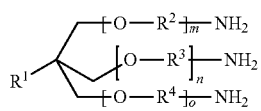

(1)

wherein $R^1$ is a substituted or unsubstituted alkyl group which has 1 to 4 carbon atoms and has a straight chain or a branched chain;

$R^2$, $R^3$, and $R^4$ are substituted or unsubstituted alkylene groups each of which has 1 to 4 carbon atoms and has a straight chain or a branched chain, and $R^2$, $R^3$, and $R^4$ are identical with each other or different from each other; and each of m, n, and o is an integer of 1 to 5.

According to a second aspect, there is provided a water-based ink for ink-jet recording including: the water-based coloring material as defined in the first aspect; water; and a water-soluble organic solvent.

According to a third aspect, there is provided an ink-jet recording method including discharging the water-based ink for ink-jet recording as defined in the second aspect to the medium.

According to a fourth aspect, there is provided an ink-jet recording apparatus including an ink accommodating section which accommodates the water-based ink for ink-jet recording as defined in the second aspect; and an ink discharge mechanism which discharges the water-based ink accommodated in the ink accommodating section to the medium.

BRIEF DESCRIPTION OF THE DRAWING

FIG. 1 schematically shows an exemplary arrangement of an ink-jet recording apparatus according to the present teaching.

DESCRIPTION OF THE PREFERRED EMBODIMENTS

In the present teaching, the "curl" includes the minus curl (hereinafter referred to as "immediate curl", i.e., "curl provided immediately after coloring") in which the four corners of a medium are lifted upwardly when the colored medium (recorded matter) is placed on a flat stand with a colored surface (recording surface) being directed downwardly immediately after the water-based coloring material colors the medium together with water (immediately after the recording), and the plus curl (hereinafter referred to as "long term curl") in which the four corners of the medium are lifted upwardly when the medium is placed on a flat stand with the colored surface being directed upwardly until a certain period of time (for example, not less than 1 day) elapses after the coloring. According to the water-based coloring material of the present teaching, it is possible to suppress both of the immediate curl and the long term curl.

An explanation will be made about the water-based coloring material which colors the medium and which is to be used together with water according to the present teaching. The water-based coloring material of the present teaching includes the colorant and the polyetheramine represented by the chemical formula (1) described above. Specified examples of the water-based coloring material are exemplified, for example, by water-based inks which are usable for writing tools including, for example, water-based ball-point pens, water-based felt pens, and water-based marker pens; painting colors which include, for example, watercolor painting colors; and water-based inks which are usable for various printers and printing machines. Therefore, the water-based ink for ink-jet recording is also included in the water-based coloring material which colors the medium and which is to be used together with water according to the present teaching.

The water-based coloring material is applied to the medium together with water to color the medium. Therefore, especially when the regular paper is used as the medium, the problem arises in relation to the immediate curl and the long term curl. The water-based coloring material of the present teaching contains the polyetheramine represented by the chemical formula (1). Therefore, it is possible to sufficiently suppress the curl of the medium after the coloring.

The water-based coloring material according to the present teaching, may be, for example, dissolved in water and applied to the medium together with water as the solvent, in the same manner as the watercolor painting color. The water-based coloring material of the present teaching may further contain water. In this case, the water-based coloring material of the present teaching may be, for example, a liquid water-based ink. The water-based coloring material of the present teaching will be explained below as exemplified by a water-based ink for ink-jet recording.

The water-based ink for ink-jet recording of the present teaching (hereinafter simply referred to as "water-based ink" or "ink" in some cases) will be explained. The water-based ink of the present teaching resides in the water-based coloring material which is to be used together with water as described above, which further contains water and a water-soluble organic solvent. The colorant is not specifically limited, which may be either a pigment or a dye. The pigment and the dye may be mixed and used as the colorant.

The pigment is exemplified, for example, by carbon black, inorganic pigments, and organic pigments. The carbon black is exemplified, for example, by furnace black, lamp black, acetylene black, and channel black. The inorganic pigment may be exemplified, for example, by titanium oxide, inorganic pigments based on iron oxide, and inorganic pigments based on carbon black. The organic pigment is exemplified, for example, by azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Any other pigment is also usable provided that the pigment is dispersible in the water phase. Specified examples of the pigments as described above include, for example, C. I. Pigment Blacks 1, 6, and 7; C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; and C. I. Pigment Greens 7 and 36.

The pigment may be any self-dispersible pigment. The self-dispersible pigment is dispersible in water without using any dispersing agent, for example, owing to the fact that at least one of the hydrophilic functional group and the salt thereof including, for example, carbonyl group, hydroxyl group, carboxylic acid group, sulfonic acid group, and phosphoric acid group is introduced into the pigment particles by the chemical bond directly or with any other group intervening therebetween. Those usable as the self-dispersible pigment include, for example, those in which the pigment is treated or processed in accordance with any method described, for example, in Japanese Patent Application Laid-open No. 8-3498, Japanese Patent Application Laid-open No. 2000-513396 (PCT), Japanese Patent Application Laid-open No. 2008-524400 (PCT), and Japanese Patent Application Laid-open No. 2009-515007 (PCT). As for the raw material for the self-dispersible pigment, it is possible to use any one of inorganic pigments and organic pigments. The pigment, which is suitable to perform the treatment as described above, includes, for example, carbon blacks such as "MA8" and "MA100" produced by Mitsubishi Chemical Corporation and "Color Black FW200" produced by Degussa. For example, any commercially available product may be used for the self-dispersible pigment. The commercially available product includes, for example, "CAB-O-JET (trade name) 200", "CAB-O-JET (trade name) 250C", "CAB-β-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink Mfg. Co., Ltd.

The blending amount of the solid content of the pigment with respect to the total amount of the water-based ink (pigment solid content amount) is not specifically limited, which can be appropriately determined depending on, for example, the desired optical density and the coloration or colorfulness. The pigment solid content amount is, for example, 0.1% by weight to 20% by weight, preferably 1% by weight to 10% by weight, and more preferably 2% by weight to 8% by weight.

The dye is not specifically limited, which is exemplified, for example, by direct dyes, acid dyes, basic dyes, and reactive dyes. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. C. I. Direct Black is exemplified, for example, by C. I. Direct Blacks 17, 19, 32, 51, 71, 108, 146, 154, and 168. C. I. Direct Blue is exemplified, for example, by C. I. Direct Blues 6, 22, 25, 71, 86, 90, 106, and 199. C. I. Direct Red is exemplified, for example, by C. I. Direct Reds 1, 4, 17, 28, 83, and 227. C. I. Direct Yellow is exemplified, for example, by C. I. Direct Yellows 12, 24, 26, 86, 98, 132, 142, and 173. C. I. Direct Orange is exemplified, for example, by C. I. Direct Oranges 34, 39, 44, 46, and 60. C. I. Direct Violet is exemplified, for example, by C. I. Direct Violets 47 and 48. C. I. Direct Brown is exemplified, for example, by C. I. Direct Brown 109. C. I. Direct Green is exemplified, for example, by C. I. Direct Green 59. C. I. Acid Black is exemplified, for example, by C. I. Acid Blacks 2, 7, 24, 26, 31, 52, 63, 112, and 118. C. I. Acid Blue is exemplified, for example, by C. I. Acid Blues 9, 22, 40, 59, 93, 102, 104, 117, 120, 167, 229, and 234. C. I. Acid Red is exemplified, for example, by C. I. Acid Reds 1, 6, 32, 37, 51, 52, 80, 85, 87, 92, 94, 115, 180, 256, 289, 315, and 317. C. I. Acid Yellow is exemplified, for example, by C. I. Acid Yellows 11, 17, 23, 25, 29, 42, 61, and 71. C. I. Acid Orange is exemplified, for example, by C. I. Acid Oranges 7 and 19. C. I. Acid Violet is exemplified, for example, by C. I. Acid Violet 49. C. I. Basic Black is exemplified, for example, by C. I. Basic Black 2. C. I. Basic Blue is exemplified, for example, by C. I. Basic Blues 1, 3, 5, 7, 9, 24, 25, 26, 28, and 29. C. I. Basic Red is exemplified, for example, by C. I. Basic Reds 1, 2, 9, 12, 13, 14, and 37. C. I. Basic Violet is exemplified, for example, by C. I. Basic Violets 7, 14, and 27. C. I. Food Black is exemplified, for example, by C. I. Food Blacks 1 and 2.

The blending amount of the dye with respect to the total amount of the water-based ink is not specifically limited, which is, for example, 0.1% by weight to 20% by weight, and preferably 0.3% by weight to 10% by weight.

One type of the colorant may be used singly. Alternatively, two or more types of the colorants may be used in combination.

It is preferable that the water is ion exchange water or pure water. The blending amount of water (water ratio) with respect to the total amount of the water-based ink is, for example, 10% by weight to 90% by weight, and preferably 40% by weight to 80% by weight. The water ratio may be, for example, the balance of the other components. As described above, it is unnecessary for the water-based ink of the present teaching to decrease water. Therefore, the viscosity is not increased.

The water-soluble organic solvent includes, for example, a humectant (moistening agent) which prevents the water-based ink from being dried at the nozzle forward end portion of the ink-jet head, and a penetrant (permeating agent) which adjusts the drying speed on the recording medium.

The humectant is not specifically limited, which includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyhydric alcohols such as polyalkylene glycols, alkylene glycols, and glycerol; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, ethylene glycol, propylene glycol, butylene glycol, diethylene glycol, triethylene glycol, dipropylene glycol, tripropylene glycol, thiodiglycol, and hexylene glycol. One type of the humectant as described above may be used singly, or two or more types of the humectants as described above may be used in combination. In particular, it is preferable to use polyhydric alcohols such as alkylene glycol and glycerol.

The blending amount of the humectant with respect to the total amount of the water-based ink is, for example, 0% by weight to 95% by weight.

The penetrant includes, for example, glycol ether compounds. The glycol ether compound includes, for example, ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. One type of the penetrant as described above may be used singly, or two or more types of the penetrants as described above may be used in combination.

The blending amount of the penetrant with respect to the total amount of the water-based ink is, for example, 0% by weight to 20% by weight, preferably 0.1% by weight to 15% by weight, and more preferably 0.5% by weight to 10% by weight.

As described above, the water-based ink contains the polyetheramine represented by the chemical formula (1). Owing to the fact that the water-based ink contains the polyetheramine represented by the chemical formula (1), it is possible to suppress both of the immediate curl and the long term curl.

In the chemical formula (1), $R^1$ is the alkyl group having the number of carbon atom or atoms of 1 to 4 (having 1 to 4 carbon atoms). The alkyl group having the number of carbon atom or atoms 1 to 4 may have a straight chain or a branched chain, which is exemplified by methyl group, ethyl group, n-propyl group, isopropyl group, n-butyl group, sec-butyl group, isobutyl group, and tert-butyl group. The alkyl group having the number of carbon atom or atoms of 1 to 4 may have a substituent such as halogen atom or the like.

In the chemical formula (1), $R^2$, $R^3$, and $R^4$ are the alkylene groups each having the number of carbon atom or atoms of 1 to 4 (having 1 to 4 carbon atoms). The alkylene group having the number of carbon atom or atoms of 1 to 4 is exemplified, for example, by methylene group, ethylene group, propylene group, and butylene group. The alkylene group having the number of carbon atom or atoms of 1 to 4 may have a substituent such as halogen atom or the like, which may have a straight chain or a branched chain. In the chemical formula (1), $R^2$, $R^3$, and $R^4$ may be identical with each other or different from each other.

The mechanism, in which the immediate curl and the long term curl are suppressed by the polyetheramine represented by the chemical formula (1) is estimated as follows. The curl causes the special problem when the medium, to which the ink is applied (to perform the recording thereon), is the regular paper. The regular paper herein means the medium in which the cellulose fibers are exposed to the surface. The cellulose fibers form the hydrogen bonds by the aid of, for example, the hydroxyl groups (—OH) possessed thereby in the regular paper before the application of the ink, and the cellulose fibers retain appropriate spacing distances.

When any conventional water-based ink is applied to the regular paper, then water makes invasion into the spaces between the cellulose fibers, and the hydrogen bonds formed between the cellulose fibers are inhibited. The spacing distances between the cellulose fibers are widened by the invaded water. This phenomenon arises principally on the recording surface of the regular paper to which the ink is applied. Therefore, the recording surface of the regular paper swells as compared with the back surface. As a result, the minus curl, i.e., the immediate curl, in which the four corners of the regular paper are warped toward the back surface side, is caused.

On the contrary, when the ink of the present teaching is applied to the regular paper, then the polyetheramine advances into the spaces between the cellulose fibers prior to water, and the polyetheramine forms the hydrogen bonds with the cellulose fibers. Accordingly, the spaces between the cellulose fibers are not widened beyond the size of the polyetheramine. Further, the polyetheramine has the high water retention performance. Therefore, the polyetheramine holds or retains water in the ink in the regular paper, and hence the cellulose fibers are hardly affected by water directly. In this way, it is considered that the ink of the present teaching can suppress the swelling of the recording surface of the regular paper, and it is possible to suppress the immediate curl.

Next, the long-term curl will be explained. When any conventional ink is applied to the regular paper, the hydrogen bonds between the cellulose fibers are inhibited by water as described above. When a certain period of time elapses after the application of the ink, then water in the ink is removed from the regular paper on account of the drying, and the cellulose fibers are mutually form the hydrogen bonds again. The rebinding between the cellulose fibers is caused randomly. Therefore, the distance between the cellulose fibers is not returned to be in the state having been provided before the application of the ink, and the distance is shrunk as compared with the distance provided before the application of the ink. Therefore, the recording surface of the regular paper is shrunk as compared with the back surface after the drying of the ink to cause the plus curl, i.e., the long term curl in which the four corners of the regular paper are warped toward the recording surface side.

On the contrary, in the case of the ink of the present teaching, the polyetheramine stays between the cellulose fibers even after the drying of water, and the hydrogen bonds are maintained with respect to the cellulose fibers. Accordingly, the rebinding between the cellulose fibers is avoided, and the distance between the cellulose fibers is prevented from being decreased. As a result, it is possible to suppress the long term curl.

It is considered that the structure and the molecular weight of the polyetheramine represented by the chemical formula (1) are important in the estimated mechanism as described above. The polyetheramine represented by the chemical formula (1) has the branched structure having three chains of polyetheramines, wherein the respective chains can form the hydrogen bonds with respect to the cellulose fibers. It is considered that the distance between the cellulose fibers can be retained appropriately owing to the branched structure. For example, trimethylolpropane and glycerol, which have been hitherto used to suppress the curl, have the small molecular weights. Therefore, trimethylolpropane and glycerol are moved in the regular paper (migration) during the drying of the ink, and water retained by themselves are released. Therefore, it is impossible to sufficiently suppress the long term curl. On the contrary, the polyetheramine represented by the chemical formula (1) has the appropriate size, i.e., the molecular weight, and the inherent branched structure whereby the polyetheramine stays in the cellulose fibers to retain water during the drying of the ink. Therefore, it is considered that the long term curl can be sufficiently suppressed.

It is preferable that the polyetheramine is polyetheramine represented by the chemical formula (2).

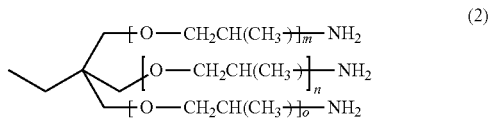

(2)

In the chemical formula (1) and the chemical formula (2), each of m, n, and o is an integer of 1 to 5.

The molecular weight of polyetheramine is, for example, 200 to 1300, and preferably 300 to 1100. As described above, the molecular weight is preferably not less than 200 in view of the fact that the movement (migration) of polyetheramine in the regular paper is efficiently avoided during the drying of the ink, and the molecular weight is preferably not more than 1300 in order to easily enter the spaces between the cellulose fibers.

The polyetheramine is exemplified, for example, by Polyetheramine T 403 (trade name) produced by BASF. One type of the polyetheramine may be used singly, or two or more types of the polyetheramines may be used in combination.

The blending amount of the polyetheramine with respect to the total amount of the water-based ink is not specifically limited. However, the blending amount of the polyetheramine is preferably not less than 35% by weight. When the blending amount of the polyetheramine is not less than 35% by weight, it is possible to more appropriately suppress the immediate curl. The blending amount of the polyetheramine is more preferably 38% by weight to 50% by weight.

The water-based ink may further contain conventionally known additives, if necessary. The additive includes, for example, surfactants, pH-adjusting agents, viscosity-adjusting agents, surface tension-adjusting agents, and fungicides. The viscosity-adjusting agent includes, for example, polyvinyl alcohol, cellulose, and water-soluble resin.

The water-based ink can be prepared, for example, such that the colorant, water, the water-soluble organic solvent, the polyetheramine, and optionally other additive components are mixed uniformly or homogeneously by any conventionally known method, and undissolved matters are removed by a filter or the like.

The water-based ink for ink-jet recording of the present teaching explained above is capable of sufficiently suppressing the curl of the recorded matter. It is unnecessary to decrease water, and hence the viscosity is not increased as well.

In another viewpoint, the water-based ink for ink-jet recording of the present teaching can be also provided as an ink cartridge. The ink cartridge of the present teaching resides in an ink cartridge including a water-based ink for ink-jet recording, wherein the water-based ink is the water-based ink for ink-jet recording of the present teaching. For example, a conventionally known main body can be used as a main body of the ink cartridge.

The water-based coloring material, which is to be used together with water, has been explained above as exemplified by the water-based ink for ink-jet recording by way of example. Although the explanation is repeated, also in the case of any water-based coloring material other than the water-based ink for ink-jet recording, it is possible to sufficiently suppress the curl of the medium after the coloring by containing the polyetheramine represented by the chemical formula (1) in the same manner as in the water-based ink for ink-jet recording. The water-based coloring material of the present teaching may further contain water, which can be used as the water-based ink, for example, for writing tools, various printers, and printing machines. In this case, the blending amount of polyetheramine is preferably not less than 35% by weight and more preferably 38% by weight to 50% by weight with respect to the total amount of the water-based coloring material, in the same manner as in the water-based ink for ink-jet recording described above.

Next, an explanation will be made about an ink-jet recording method and an ink-jet recording apparatus according to the present teaching.

The ink-jet recording method according to the present teaching resides in an ink-jet recording method for performing recording by discharging a water-based ink to a recording medium in accordance with an ink-jet system, wherein the water-based ink for ink-jet recording of the present teaching is used as the water-based ink.

The ink-jet recording apparatus according to the present teaching resides in an ink-jet recording apparatus including an ink accommodating section and an ink discharge mechanism, for discharging an ink accommodated in the ink accommodating section by the ink discharge mechanism, wherein the water-based ink for ink-jet recording of the present teaching is accommodated in the ink accommodating section.

The ink-jet recording method of the present teaching can be carried out, for example, by using the ink-jet recording apparatus of the present teaching. The recording includes, for example, the printing of letters, the printing of images, and the printing.

The ink-jet recording apparatus of the present teaching may be, for example, an ink-jet recording apparatus on which a line type ink-jet head is carried or an ink-jet recording apparatus on which a serial type ink-jet head is carried. The line type ink-jet recording apparatus is such an ink-jet recording apparatus that the line type ink-jet head, which has a recording width of not less than the width of the recording medium, is used, and the recording can be collectively performed in the widthwise direction of the recording medium in a state in which the ink-jet head is fixed. On the contrary, in the case of the serial type ink-jet recording apparatus, the recording is performed while moving the ink-jet head itself in the widthwise direction of the recording surface of the recording medium. The line type ink-jet recording apparatus has the recording speed which is extremely faster than that of the serial type ink-jet recording apparatus. The water-based ink for ink-jet recording of the present teaching can suppress the immediate curl. Therefore, the water-based ink for ink-jet recording of the present teaching is applicable to the high speed recording performed by the line type ink-jet recording apparatus.

FIG. 1 schematically shows an exemplary arrangement of the ink-jet recording apparatus according to the present teaching. The ink-jet recording apparatus 101 of this embodiment carries the line type ink-jet head. As shown in the drawing, the ink jet recording apparatus 101 includes, as main constitutive elements, four ink cartridges 1, four ink discharge mechanisms (ink-jet heads) 2, a paper feed unit 11, a paper discharge unit 12, a belt transport mechanism 13, and a control unit 16 which controls the entire ink-jet recording apparatus 101. The paper feed unit 11 is arranged on one side (left side in FIG. 1) of the belt transport mechanism 13. The paper discharge unit 12 is arranged on the other side (right side in FIG. 1) of the belt transport mechanism 13.

A recording paper transport route, in which the recording medium (for example, the recording paper) P is transported from the paper feed unit 11 toward the paper discharge unit 12 by the aid of the belt transport mechanism 13, is formed in the ink-jet recording apparatus 101. The direction, in which the recording paper P is transported, is designated as the recording paper transport direction X. The paper feed unit 11 includes a recording paper stocker 11a and a pickup roller 11c. The recording paper stocker 11a accommodates the sheets of the recording paper P therein in a stacked state, which has an opening formed at the upper surface thereof. The recording paper stocker 11a is arranged in a state of being inclined toward the downstream side in the recording paper transport direction X (right side in FIG. 1, hereinafter simply referred to as "downstream side"). A support plate 11b, which is urged by a spring 11d in the direction directed from the bottom surface toward the upper opening, is arranged in the recording paper stocker 11a. The recording paper P is stacked on the support plate 11b. The pickup roller 11c is driven by a placement motor (not shown). Accordingly, the sheets of the recording paper P, which are stacked in the recording paper stocker 11a, are picked up (taken out) one by one from the top, and the picked up recording paper P is fed to the downstream side. A recording paper detection sensor 59 is arranged just downstream from the paper feed unit 11. The recording paper detection sensor 59 detects whether or not the fed recording paper P arrives at the recording waiting position A positioned just upstream (on the left side in FIG. 1) in the recording paper transport direction X from the belt transport mechanism 13. The adjustment is made so that the end portion on the downstream side of the recording paper P disposed at the recording waiting position A can be detected. The fed recording paper P passes through the recording waiting position A, and the recording paper P is transported to the belt transport mechanism 13.

The belt transport mechanism 13 includes two belt rollers 6, 7, a transport belt 8, a platen 15, and a transport motor (not shown). The transport belt 8 is an endless belt which is wound around so that the transport belt 8 is applied between the two belt rollers 6, 7. The outer surface of the transport belt 8 is designated as an outer circumferential surface 8a. The platen 15 is arranged at the position opposed to the four ink-jet heads 2 as described later on in the area surrounded by the transport belt 8. The platen 15 supports the transport belt 8 so that the transport belt 8 is not flexibly bent downwardly in the area opposed to the four ink-jet heads 2. A nip roller 4 is arranged at the position opposed to the belt roller 7. The nip roller 4 presses the recording paper P against the outer circumferential surface 8a when the recording paper P, which is transported to the belt transport mechanism 13, is placed on the outer circumferential surface 8a. When the transport motor rotates the belt roller 6, the transport belt 8 is driven (rotated). Accordingly, the transport belt 8 transports the pressed recording paper P toward the paper discharge unit 12, while adhesively holding the pressed recording paper P. An exfoliating mechanism 14 is provided just downstream from the transport belt 8. The exfoliating mechanism 14 is constructed such that the recording paper P, which is adhesively stuck to the outer circumferential surface 8a, is exfoliated from the outer circumferential surface 8a, and the recording paper P is fed toward the paper discharge unit 12.

Each of the four ink cartridges 1 includes each of four color water-based inks of yellow, magenta, cyan, and black one by one. The four ink cartridges 1 are aligned and fixed on the belt transport mechanism 13 in the recording paper transport direction X. The four ink cartridges 1 have the ink-jet heads 2 disposed at the lower ends thereof respectively. The ink droplets are discharged from the ink discharge surfaces 2a toward the upper surface of the recording paper P, i.e., the recording area formed on the recording surface when the recording paper P, which is transported by the transport belt 8, successively passes just under the four ink-jet heads 2. Accordingly, a desired image can be formed on the recording area of the recording paper P.

EXAMPLES

Next, Examples of the present teaching will be explained together with Comparative Examples. It is noted that the present teaching is not limited and restricted to Examples and Comparative Examples described below.

Examples 1 to 11 and Comparative Examples 1 to 5

An ink solvent was obtained by uniformly mixing components except for a water dispersion of self-dispersible pigment in relation to a water-based ink composition (Table 1). Subsequently, the ink solvent was added to the water dispersion of the self-dispersible pigment, followed by being mixed uniformly. After that, an obtained mixture was filtrated through a cellulose acetate type membrane filter (pore size: 3.00 μm) produced by Toyo Roshi Kaisha, Ltd. Thus, water-based inks for ink-jet recording of Examples 1 to 11 and Comparative Examples 1 to 5 were obtained.

Example 12

Respective components in a water-based ink composition (Table 1) were uniformly mixed. After that, an obtained mixture was filtrated by using a hydrophilic polytetrafluoroethylene (PTFE) type membrane filter (pore size: 0.20 μm) produced by Toyo Roshi Kaisha, Ltd. Thus, a water-based ink for ink-jet recording of Example 12 was obtained.

The water-based inks of Examples and Comparative Examples were subjected to (a) evaluation of immediate curl, (b) evaluation of long term curl, and (c) overall evaluation in accordance with the following methods.

(a) Evaluation of Immediate Curl

Each of the water-based inks of Examples and Comparative Examples was applied onto the regular paper having the A4 size (297 mm×210 mm) by using a bar coater (rod No. 3 of the bar coater produced by Yasuda Seiki Seisakusho LTD.). The regular paper after the application was placed on a flat stand while directing the applied surface downwardly. The lifting heights of the four corners of the regular paper, which were obtained 10 seconds, 1 minute, and 3 minutes after the application, were measured to evaluate the immediate curl in accordance with the following evaluation criterion. When the immediate curl is suppressed in the entire surface application with the bar coater, it can be judged that the immediate curl can be also suppressed in the ink jet recording.

Evaluation Criterion for Immediate Curl after 10 Seconds, after 1 Minute, and after 3 Minutes A: The portion, which was included in the four corners and which was lifted most upwardly, had a lifting height of less than 30 mm.
B: The portion, which was included in the four corners and which was lifted most upwardly, had a lifting height of not less than 30 mm and less than 50 mm.
C: The portion, which was included in the four corners and which was lifted most upwardly, had a lifting height of not less than 50 mm.

Evaluation Criterion for Integrated Evaluation of Immediate Curl

A: All evaluation results after 10 seconds, after 1 minute, and after 3 minutes were A.
B+: B was present in any one of evaluation results after 10 seconds, after 1 minute, and after 3 minutes, but C was absent.
B-: Any one of evaluation results after 10 seconds, after 1 minute, and after 3 minutes was C.
C: Two or more of evaluation results after 10 seconds, after 1 minute, and after 3 minutes were C.

(b) Evaluation of Long Term Curl

The regular paper, which was used after the short term evaluation, was placed on a flat stand while directing the applied surface upwardly to measure the lifting heights of the four corners of the regular paper 1 day and 7 days after the application. The long term curl was evaluated in accordance with the following evaluation criterion. When the long term curl is suppressed in the entire surface application with the bar coater, it can be judged that the long term curl can be also suppressed in the ink-jet recording.

Evaluation Criterion for Long Term Curl after 1 Day and after 7 Days

A: The portion, which was included in the four corners and which was lifted most upwardly, had a lifting height of less than 30 mm.
B: The portion, which was included in the four corners and which was lifted most upwardly, had a lifting height of not less than 30 mm and less than 50 mm.
C: The portion, which was included in the four corners and which was lifted most upwardly, had a lifting height of not less than 50 mm.

Evaluation Criterion for Integrated Evaluation of Long Term Curl

A: All evaluation results after 1 day and after 7 days were A.
B+: One of evaluation results after 1 day and after 7 days was A and the other was B.
B-: Any one of evaluation results after 1 day and after 7 days was C.
C: Both of evaluation results after 1 day and after 7 days were C.

(c) Overall Evaluation

The overall evaluation was performed in accordance with the following evaluation criterion from the results of (a) and (b) described above for the respective water-based inks.

Evaluation Criterion for Overall Evaluation

G: All of the evaluation results of the immediate curl (integrated) and the long term curl (integrated) were not C.
NG: Any one of or both of the evaluation results of the immediate curl (integrated) and the long term curl (integrated) was/were C.

Compositions and evaluation results of the water-based inks of Examples 1 to 12 and Comparative Examples 1 to 5 are shown in Table 1. In Table 1, Polyetheramine T403, which was used in Examples 1 to 12, is the polyetheramine represented by the chemical formula (2) described above, i.e., the substance represented by the chemical formula (1). On the other hand, Polyetheramine T5000, which was used in Comparative Example 5, is represented by the following chemical formula (3), which is polyetheramine but which has a structure different from that of the chemical formula (1). In order to use any polyetheramine in Comparative Example, the present inventors found out T5000 which was used in Comparative Example 5.

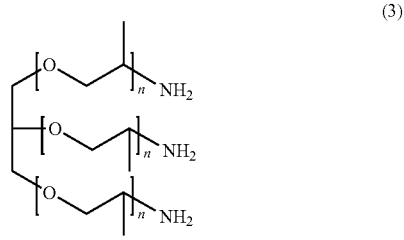

(3)

In the chemical formula (3), n is 85.

TABLE 1

|  |  | Example | | | | | |
| --- | --- | --- | --- | --- | --- | --- | --- |
|  |  | 1 | 2 | 3 | 4 | 5 | 6 |
| Water base ink composition (% by weight) | CAB-O-JET (trade name) 300 *1 | 26.7 (4.0) | 26.7 (4.0) | 26.7 (4.0) | 26.7 (4.0) | 26.7 (4.0) | 26.7 (4.0) |
|  | CAB-O-JET (trade name) 270Y *2 | — | — | — | — | — | — |
|  | CAB-O-JET (trade name) 260M *3 | — | — | — | — | — | — |
|  | CAB-O-JET (trade name) 250C *4 | — | — | — | — | — | — |
|  | C.I. Acid Red 52 | — | — | — | — | — | — |
|  | Polyetheramine T403 *5 | 50.0 | 45.0 | 40.0 | 38.0 | 35.0 | 30.0 |
|  | Polyetheramine T5000 *7 | — | — | — | — | — | — |
|  | Glycerol | — | — | — | — | — | — |

TABLE 1-continued

|  |  |  | | | | | | |
|---|---|---|---|---|---|---|---|---|
|  | Trimethylolpropane |  | — | — | — | — | — | — |
|  | Dipropylene glycol n-propyl ether |  | 2.0 | 2.0 | 2.0 | 2.0 | 2.0 | 2.0 |
|  | Sodium polyoxyethylene lauryl ether sulfate *6 |  | 1.0 | 1.0 | 1.0 | 1.0 | 1.0 | 1.0 |
|  | Water |  | balance | balance | balance | balance | balance | balance |
| Evaluation | Immediate curl evaluation | after 10 seconds | A | A | A | A | B | C |
|  |  | after 1 minute | A | A | A | A | A | A |
|  |  | after 3 minutes | A | A | A | A | A | A |
|  |  | integrated evaluation | A | A | A | A | B+ | B− |
|  | Long term curl evaluation | after 1 day | A | A | A | A | A | A |
|  |  | after 7 days | A | A | A | A | A | A |
|  |  | integrated evaluation | A | A | A | A | A | A |
|  | Overall evaluation |  | G | G | G | G | G | G |

|  |  |  | Example | | | | | |
|---|---|---|---|---|---|---|---|---|
|  |  |  | 7 | 8 | 9 | 10 | 11 | 12 |
| Water base ink composition (% by weight) | CAB-O-JET (trade name) 300 *1 |  | 26.7 (4.0) | 26.7 (4.0) | — | — | — | — |
|  | CAB-O-JET (trade name) 270Y *2 |  | — | — | 40.0 (4.0) | — | — | — |
|  | CAB-O-JET (trade name) 260M *3 |  | — | — | — | 40.0 (4.0) | — | — |
|  | CAB-O-JET (trade name) 250C *4 |  | — | — | — | — | 30.0 (3.0) | — |
|  | C.I. Acid Red 52 |  | — | — | — | — | — | 3.0 |
|  | Polyetheramine T403 *5 |  | 20.0 | 10.0 | 45.0 | 45.0 | 45.0 | 45.0 |
|  | Polyetheramine T5000 *7 |  | — | — | — | — | — | — |
|  | Glycerol |  | — | — | — | — | — | — |
|  | Trimethylolpropane |  | — | — | — | — | — | — |
|  | Dipropylene glycol n-propyl ether |  | 2.0 | 2.0 | 2.0 | 2.0 | 2.0 | 2.0 |
|  | Sodium polyoxyethylene lauryl ether sulfate *6 |  | 1.0 | 1.0 | 1.0 | 1.0 | 1.0 | 1.0 |
|  | Water |  | balance | balance | balance | balance | balance | balance |
| Evaluation | Immediate curl evaluation | after 10 seconds | C | C | A | A | A | A |
|  |  | after 1 minute | A | A | A | A | A | A |
|  |  | after 3 minutes | A | A | A | A | A | A |
|  |  | integrated evaluation | B− | B− | A | A | A | A |
|  | Long term curl evaluation | after 1 day | A | A | A | A | A | A |
|  |  | after 7 days | A | A | A | A | A | A |
|  |  | integrated evaluation | A | A | A | A | A | A |
|  | Overall evaluation |  | G | G | G | G | G | G |

|  |  |  | Comparative Example | | | | |
|---|---|---|---|---|---|---|---|
|  |  |  | 1 | 2 | 3 | 4 | 5 |
| Water base ink composition (% by weight) | CAB-O-JET (trade name) 300 *1 |  | 26.7 (4.0) | 26.7 (4.0) | 26.7 (4.0) | 26.7 (4.0) | 26.7 (4.0) |
|  | CAB-O-JET (trade name) 270Y *2 |  | — | — | — | — | — |
|  | CAB-O-JET (trade name) 260M *3 |  | — | — | — | — | — |
|  | CAB-O-JET (trade name) 250C *4 |  | — | — | — | — | — |
|  | C.I. Acid Red 52 |  | — | — | — | — | — |
|  | Polyetheramine T403 *5 |  | — | — | — | — | — |
|  | Polyetheramine T5000 *7 |  | — | — | — | — | 45.0 |
|  | Glycerol |  | 30.0 | 45.0 | — | — | — |
|  | Trimethylolpropane |  | — | — | 20.0 | 45.0 | — |
|  | Dipropylene glycol n-propyl ether |  | 2.0 | 2.0 | 2.0 | 2.0 | 2.0 |
|  | Sodium polyoxyethylene lauryl ether sulfate *6 |  | 1.0 | 1.0 | 1.0 | 1.0 | 1.0 |
|  | Water |  | balance | balance | balance | balance | balance |
| Evaluation | Immediate curl evaluation | after 10 seconds | C | C | C | C | C |
|  |  | after 1 minute | C | C | B | B | A |
|  |  | after 3 minutes | C | C | B | B | A |
|  |  | integrated evaluation | C | C | B− | B− | B− |
|  | Long term curl evaluation | after 1 day | C | C | C | C | C |
|  |  | after 7 days | C | C | C | C | C |
|  |  | integrated evaluation | C | C | C | C | C |
|  | Overall evaluation |  | NG | NG | NG | NG | NG |

In Table 1:

*1: Water dispersion of self-dispersible pigment, produced by Cabot, pigment concentration = 15% by weight, parenthesized numeral indicates pigment solid content amount;

*2: Water dispersion of self-dispersible pigment, produced by Cabot, pigment concentration = 10% by weight, parenthesized numeral indicates pigment solid content amount;

*3: Water dispersion of self-dispersible pigment, produced by Cabot, pigment concentration = 10% by weight, parenthesized numeral indicates pigment solid content amount;

*4: Water dispersion of self-dispersible pigment, produced by Cabot, pigment concentration = 10% by weight, parenthesized numeral indicates pigment solid content amount;

*5: Produced by BASF;

*6: Oxyethylene average polymerization degree = 12;

*7: Produced by BASF.

As shown in Table 1, the results of the immediate curl evaluation and the long term curl evaluation were satisfactory for the water-based inks of Examples 1 to 12. In particular, in Example 5 in which the blending amount of polyetheramine was 35% by weight, the immediate curl after 10 seconds was suppressed more preferably. In Examples 1 to 4 and Examples 9 to 12 in which the blending amount of polyetheramine was 38% by weight to 50% by weight, the immediate curl after 10 seconds was suppressed much more preferably. It is noted that it is unnecessary to decrease water as the countermeasure to suppress the curl for the water-based inks of Examples 1 to 12. Therefore, the viscosity is not increased as well.

On the other hand, in Comparative Examples 1 and 2 in which glycerol was used in place of polyetheramine, the results of the immediate curl evaluation and the long term curl evaluation were unsatisfactory.

Further, in Comparative Examples 3 and 4 in which trimethylolpropane was used in place of polyetheramine, the results of the long term curl evaluation were unsatisfactory, although the immediate curl was slightly suppressed.

In Comparative Example 5 in which polyetheramine represented by the chemical formula (3) was used in place of polyetheramine represented by the chemical formula (2), the result of the long term curl evaluation was unsatisfactory, although the immediate curl was slightly suppressed. According to the comparison between Comparative Example 5 and Examples 1 to 12, it is considered that all substances having the polyetheramine structure do not provide the effect to avoid the curl, but polyetheramine having the unique structure represented by the chemical formula (1) provides the effect to avoid the curl.

As described above, the water-based ink according to the present teaching is capable of sufficiently suppressing the curl of the recorded matter, and the viscosity is not increased as well. The way of use of the water-based ink of the present teaching is not specifically limited. The water-based ink of the present teaching is widely applicable to various types of the ink-jet recording.

What is claimed is:

1. A water-based coloring material which colors a medium and which is to be used together with water, the water-based coloring material comprising a colorant and polyetheramine represented by chemical formula (1):

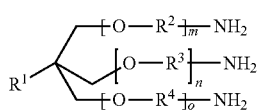

(1)

wherein $R^1$ is a substituted or unsubstituted alkyl group which has 1 to 4 carbon atoms and has a straight chain or a branched chain;

$R^2$, $R^3$, and $R^4$ are substituted or unsubstituted alkylene groups each of which has 1 to 4 carbon atoms and has a straight chain or a branched chain, and $R^2$, $R^3$, and $R^4$ are identical with each other or different from each other; and each of m, n, and o is an integer of 1 to 5.

2. The water-based coloring material according to claim 1, wherein the polyetheramine is polyetheramine represented by chemical formula (2):

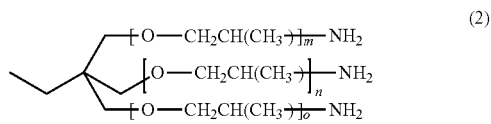

(2)

wherein each of m, n, and o is an integer of 1 to 5.

3. The water-based coloring material according to claim 1, further comprising water.

4. The water-based coloring material according to claim 3, wherein the polyetheramine is contained at not less than 35% by weight in the water-based coloring material.

5. The water-based coloring material according to claim 3, wherein the polyetheramine is contained at 38% by weight to 50% by weight in the water-based coloring material.

6. A water-based ink for ink-jet recording comprising:
the water-based coloring material as defined in claim 1;
water; and
a water-soluble organic solvent.

7. The water-based ink for ink-jet recording according to claim 6, wherein the polyetheramine is contained at not less than 35% by weight in the water-based ink.

8. The water-based ink for ink-jet recording according to claim 6, wherein the polyetheramine is contained at 38% by weight to 50% by weight in the water-based ink.

9. An ink-jet recording method comprising discharging the water-based ink for ink-jet recording as defined in claim 6 to the medium.

10. An ink-jet recording apparatus comprising:
an ink accommodating section which accommodates the water-based ink for ink-jet recording as defined in claim 6; and
an ink discharge mechanism which discharges the water-based ink accommodated in the ink accommodating section to the medium.

11. The ink-jet recording apparatus according to claim 10, wherein the ink discharge mechanism is a line type ink-jet head.

* * * * *